United States Patent [19]

van der Lely

[11] 4,147,227
[45] Apr. 3, 1979

[54] STANDARD MODEL TRACTOR WITH REMOVABLE SECOND SET OF OPERATING CONTROLS

[76] Inventor: Cornelis van der Lely, 7, Bruschenrain, Zug, Switzerland

[21] Appl. No.: 786,850

[22] Filed: Apr. 12, 1977

[30] Foreign Application Priority Data

Apr. 15, 1976 [NL] Netherlands .................. 7604010

[51] Int. Cl.$^2$ .................. B60K 26/02; B60N 1/02
[52] U.S. Cl. .................. 180/77 C; 180/77 S; 280/774
[58] Field of Search .................. 180/77 S, 77 C; 280/774

[56] References Cited

U.S. PATENT DOCUMENTS

| | | | |
|---|---|---|---|
| 2,607,432 | 8/1952 | Lommel | 180/77 S |
| 2,617,661 | 11/1952 | Kucera | 180/77 S |
| 3,039,553 | 6/1962 | van der Lely et al. | 180/77 S |
| 3,132,486 | 5/1964 | Jonkers et al. | 180/77 S |
| 3,398,984 | 8/1968 | Ajero | 180/77 S |
| 3,693,744 | 9/1972 | Horn | 180/77 S |

*Primary Examiner*—Joseph F. Peters, Jr.
*Assistant Examiner*—Donn McGiehan

*Attorney, Agent, or Firm*—Penrose Lucas Albright; William B. Mason

[57] ABSTRACT

Apparatus removably mounted on a standard model agricultural tractor of a type used principally for pulling various implements and for hauling, and to which agricultural implements cannot usually be advantageously mounted at the front of the tractor, the apparatus including a second steering device at and facing the rear and at a side of the tractor which is linked to the tractor's regular steering device. A seat for the driver may be pivoted 180° to one side for constituting a driver's seat when controlling the second steering device or two seats facing in opposite directions may be provided. A second set of pedals, such as a clutch, accelerator, and brake project from the deck of the attachment in the vicinity of the second steering device and are mechanically linked to the regular control pedals. The implements are mounted on a three-point lifting device extending from the rear of the tractor which can then be driven with facility in reverse by a driver at the second set of controls facing the rear and being disposed on one side of the tractor whereby he can view the implement while it is being operated.

12 Claims, 2 Drawing Figures

STANDARD MODEL TRACTOR WITH REMOVABLE SECOND SET OF OPERATING CONTROLS

SUMMARY OF THE INVENTION

The invention relates to a standard model tractor equipped with steering device. Tractors of the type involved are in general not suitable for operating implements or tools which are advantageously coupled with the front side of a tractor due to their construction, weight and the nature of their tasks and because the field of view of the tool's or implement's operations is hindered by such front-mounted implements.

An important object of the invention is to obviate these disadvantages.

According to the invention, a tractor is provided with a removable second steering device and a second set of controls connected to the regular set, the steering device being arranged eccentrically to the longitudinal plane of symmetry of the tractor.

The provision of a second steering device permits using the tractor, with implements or tools attached to the lifting device on the rear side of the tractor, in a direction of movement for operations which is opposite the usual traveling direction of the tractor.

For a better understanding of the invention and to show how the same may be carried into effect, reference will be made by way of example to the accompanying drawings:

DESCRIPTION OF THE PREFERRED EMBODIMENT

Figure 1:
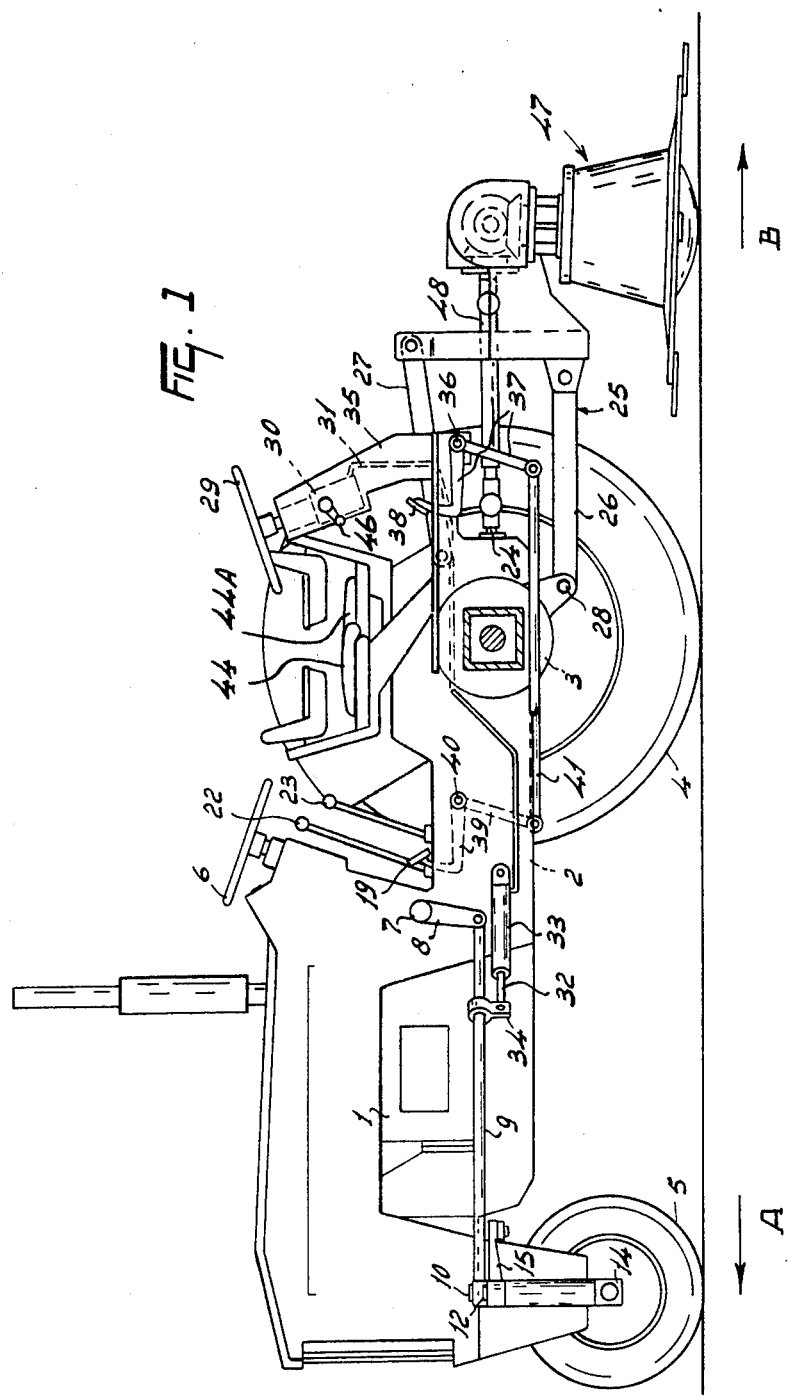
FIG. 1 is a side elevational view of a tractor embodying the invention with an implement attached.
Figure 2:
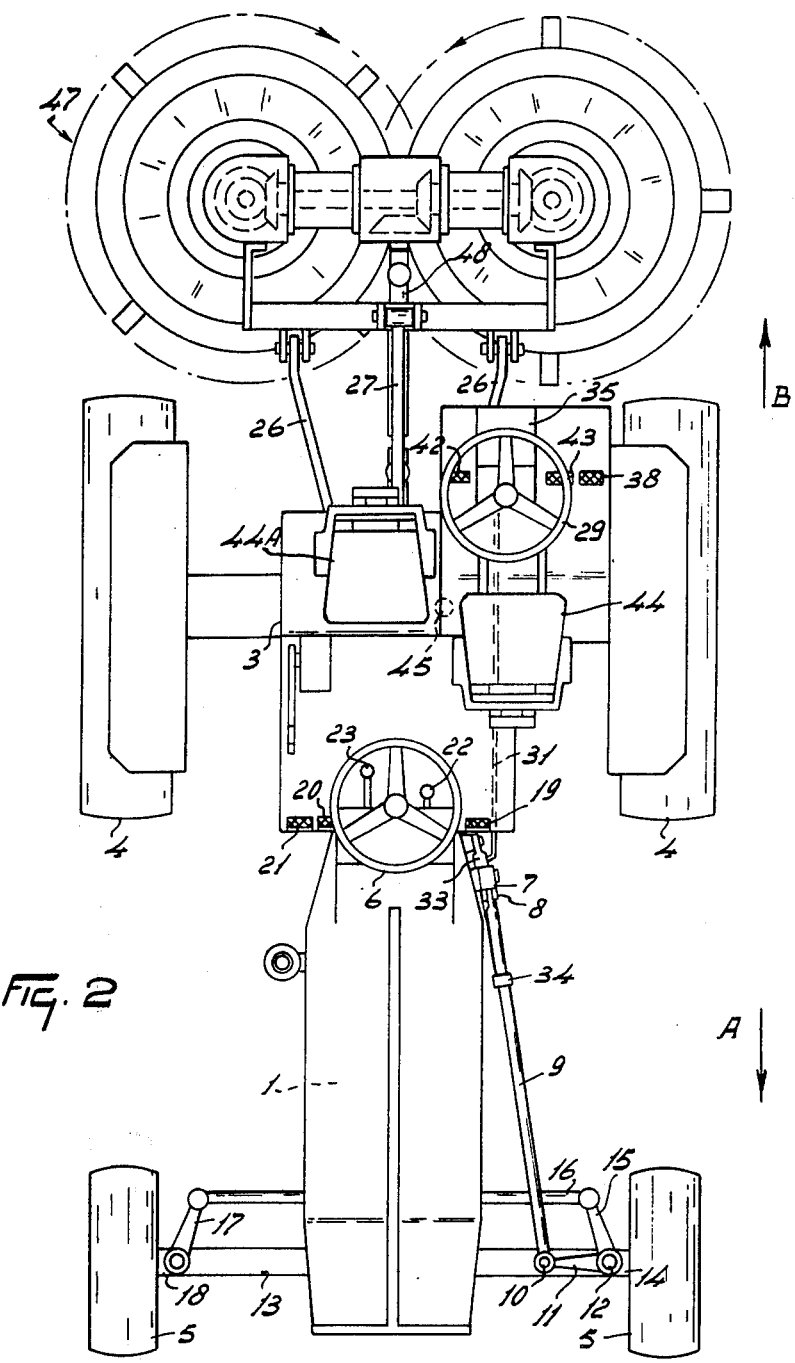
FIG. 2 is a plan view of the tractor shown in FIG. 1.

The invention relates to a conventional model tractor, particularly a tractor for agricultural purposes. The term "standard model tractor" is intended to refer to a tractor wherein a large number of essentially the same model are manufactured and marketed for general use in the agricultural industry. A tractor of such type is illustrated in FIGS. 1 and 2 which comprises in general an engine unit 1 and a torque converter 2 operatively connected thereto, followed by a differential gear 3, which transmits power from torque converter to a pair of driven rear wheels 4. Engine unit 1, usually a diesel engine, torque cnverter 2 and differential gear 3 are often constructed as a single unit, which frequently forms part of the tractor frame. A standard model tractor of the type involved has a pair of steerable front wheels 5, each having a diameter smaller than rear wheels 4. The tractor furthermore includes a steering device usually comprising a steering wheel 6, for turning a steering column located in the vertical, longitudinal plane of symmetry of the tractor received between the axles of the wheels 4 and 5. Rotation of the steering column 1 is mechanically converted into rotational movement by a horizontal shaft 7 extending transversely of the straight direction of travel A of the tractor (FIG. 1). To shaft 7 is secured a lever 8 which is pivoted to move, from the end remote from shaft 7, a forwardly extending rod 9. The end of rod 9 remote from lever 8 pivotably connects, via a vertical pin 10, with one end of a horizontal lever 11 (FIG. 2). The other end of lever 11 is pivotable about an upwardly extending pin 12 which occupies a fixed position relative a front axle support 13 of the tractor. Lever 11 is rigidly secured to an axle 14 of one of the front wheels 5. Steering motion performed by lever 11 is transmitted in known manner through a lever 15 to a coupling rod 16 and a lever 17, disposed in an angular relation opposite to that of lever 15, which is connected to an axle 18 of the other front wheel 5.

The tractor is provided with foot pedals 19, 20, and 21 disposed near steering device 6 which serve to control and actuate the engine, brake, torque converter, a power take-off shaft 23, a lifting device 25 and the like. The tractor further is provided with control levers 22 and 23 which serve as actuating members for the tractor's equipment in a known manner.

A standard model tractor of the type involved is usually also equipped with power take-off shaft 24 projecting, viewed in the direction of travel A (FIG. 1), from the rear side of the housing for differential gear 3. Viewed in direction of travel A, extending from the tractor's rear is a lifting device 25 having two lower lifting arms 26, one located on each side of the plane of symmetry and an upper bar 27. Lower arms 26 of lifting device 25 are hydraulically moved up and down in known manner about horizontal pivotal shafts 28 extending transversely of direction of travel A.

Standard tractors of the type involved generally do not provide for attachment of an implement which must be, or normally is coupled on the front end of a tractor because of its construction or function wherein a satisfactory view of the ground directly in front of the implement and of the work to be performed is necessary. This is a serious restriction on the use of standard model tractors of the type involved. The drawback is, however, eliminated by providing a removable second steering device comprising, by way of example, a steering wheel 29 adapted to rotate about an upwardly extending steering column, said steering device being arranged, viewed in direction of travel A, near the rear end of the tractor and behind steering wheel 6. Further, viewed in plan, steering device 29 is disposed eccentrically to a vertical, longitudinal plane of symmetry of the tractor, that is to say, steering wheel 29 is located between said plane of symmetry and one of the driven wheels 4. Viewed in plan and in direction of travel A, the steering column of steering wheel 29 is located behind the axle of rear wheel 4. The second steering device may comprise, in lieu of steering wheel 29 a different type of steering member formed, for example, by a lever member.

Steering device 29 is coupled with a known hydraulic actuating member 30, which transmits steering motions through hydraulic ducts 31 to a piston rod 32 which moves relative to an associated hydraulic cylinder 33. This steering hydraulic system communicates with a hydraulic system provided otherwise in the tractor. The end of piston rod 32 is fastened through a coupling member 34 to rod 9, which is coupled with steerable wheels 5 in the manner previously described. The first described regular steering device comprising steering wheel 6 is not altered.

A housing 35 accommodating steering wheel 29 and hydraulic actuating member 30 has secured to it a horizontal pivotal shaft 36, extending transversely of direction A, about which shaft a bell crank 37 is pivotable. Bell crank 37 is provided with a foot pedal 38, having the same function as the foot pedal 21 (FIG. 2). For such function, foot pedal 21 is mounted on a further bell crank such as bell crank 39, which is adapted to turn about a horizontal shaft 40 disposed normally to direction A. The bell crank for pedal 21 is pivotally connected through a coupling rod 41 with bell crank 37 of foot pedal 38. It will be appreciated by those skilled in the art that, in order correctly to combine the movements of the foot pedals 21 and 38, the pivotal shafts 40 and 36 respectively are located on the same side with respect to the associated foot pedals and with respect to the direction of travel (see the lever structure of FIG. 1), so that both of them always perform analogous motions. Foot pedals 19 and 20 of the standard model tractor are similarly coupled with foot pedals 42 and 43 respectively, with coupling rods such as coupling rods 41, shaped so that they cross one another in an appropriate non-interfering fashion. They are disposed at the side of foot pedal 38 near the second steering device and between driven wheel 4 and the plane of symmetry of the tractor and they occupy the same positions relative to one another and to the second steering device as the corresponding members of the tractor, as such.

The tractor's driver's seat located at 44A is complemented by a second seat located at 44, which is disposed eccentrically to the longitudinal plane of symmetry of the tractor whereby the driver is seated properly centered relative to steering wheel 29 and housing 35, the seat at 44 being, therefore, disposed near the rear right hand side of the tractor as seen in FIG. 2 and, viewed from the side, between the two steering wheels. As an alternative, a pivotable seat 44 may be mounted in a pivotable manner by means of a substantially vertical pivotal shaft 45, disposed between the longitudinal plane of symmetry of the tractor and seat 44 indicated in FIG. 2 by solid lines, so that seat 44 is turnable about said pivotal shaft 45, from its position 44 where designated by solid lines to its turned position 44A designated by dashed lines where it functions as a seat for controlling steering wheel 6, foot pedals 19, 20 and 21 and control-levers 22 and 23. A third alternative is a broad seat with a pivotable back extending in the direction of width of the tractor, so the driver may be seated on one side or the other for actuating either steering wheel 6 or steering wheel 29, the back being preferably pivotable in such example, about a horizontal pivotal shaft transverse of the direction of travel so that it can be tilted to the front or to the rear, as desired, there being thus always a seat available for a second driver. In any event, the tractor's control-levers 22 and 23 are always within reach by an operator in seat 44.

Housing 35 may also accommodate the control-levers 46, which are also coupled with a hydraulic control-member for actuating the engine, the torque converter, the lifting device or the power takeoff shaft.

Second steering wheel 29, the hydraulic control-members and control-levers, as well as foot pedals 38, 42, 43 and associated angular levers and, as the case may be, the second seat (which components form, at least in part, an actuating device of the tractor) may be constructed in the form of a single unit removably mountable on a standard model tractor of the type involved.

When the latter mentioned components are mounted in place, the tractor is suitable for operations in which an implement or tool 47 to be attached (in this case a front-mounted mower or a seed drill) is coupled to lifting device 25 in which a direction of movement B, opposite direction of travel A, becomes the primary or usual direction of movement, an appropriate reverse gear of the tractor being engaged. The tractor can also be driven from the seat 44 in direction A although tool 47 and other components including steering wheel 29 are mounted on the tractor. In driving by steering wheel 29 in direction B, the driver sits on the side of the tractor in direct proximity of the attachment so that a satisfactory view of the operating tool and the ground is ensured directly in front of tool 47 which is operated via an auxiliary shaft 48 coupled with power take-off shaft 24. Otherwie the scope of operations of the tractor remain the same.

With the invention, it is possible to employ implements or tools with a standard model tractor of the type involved having structure and an operation which essentially require mounting at the front (in particular fairly heavy implements, such as mowers, crushers and the like, having a weight which is directly transferred to large wheels 4), so that the tractor's scope of operations is appreciably extended.

The tractor obtained by the invention exhibits a high reliability and increased potential to meet a great variety of operating conditions, particularly with respect to different types of implements, all this being achieved in a simple, economical manner. Reliable control both of the tractor and of the implement in any direction of movement may be carried out under most difficult conditions from a fixed seat. The mode of actuation in both directions of travel A and B is the same from the corresponding seat.

Although I have described the preferred embodiment of my invention, it is to be understood that it is capable of other adaptations and modifications whereby the claims should be construed not only to cover the corresponding structure described in the specification but also the equivalents thereof.

Having thus described my invention, what I claim as new and desire to secure by Letters Patent of the United States is:

1. A tractor which comprises: driven wheels; two driver's seats, one of said seats facing the rear and being disposed between the longitudinal plane of symmetry of the tractor and one of said driven wheels of the tractor, the other of said seats facing forward and being disposed so that said plane of symmetry passes therethrough; permanent controls for the tractor thereon which are associated with said other seat, said permanent controls including a first steering device; duplicate controls for the tractor mounted thereon which are associated with said one seat, said duplicate controls including a second steering device which is detachably coupled to said first steering device, said duplicate controls being readily detachable from said tractor as a unit; said one seat being located between said permanent controls and said second steering device as seen from a side of the tractor.

2. A tractor as claimed in claim 1 wherein hydraulic means is provided for actuating said second steering device.

3. A tractor as claimed in claim 1 wherein said second steering device is associated with foot pedals coupled with the individually corresponding foot pedals associated with said first steering device.

4. A tractor as claimed in claim 3 wherein said corresponding foot pedals are intercoupled by lever means.

5. A tractor as claimed in claim 4 wherein said corresponding foot pedals are pivotable about pivot shafts located on the same side relative to the associated foot pedals and to the tractor's normally forward direction of travel.

6. A tractor as claimed in claim 5 wherein control-levers associated with said first steering device are located within hand reach from said other seat for said second steering device.

7. A tractor as claimed in claim 1 wherein said second steering device is coupled with a hydraulic cylinder and piston rod assembly which cooperates with part of said first steering device.

8. A tractor as claimed in claim 1 including a lifting device on the rear of the tractor wherein said one seat is arranged on the side of said second steering device which is more remote from said lifting device of the tractor than said other seat provided for operating said first steering device.

9. A tractor as claimed in claim 8 wherein said lifting device has attached thereto an implement or tool for being operated when the tractor travels in a direction opposite its normal forward direction.

10. A tractor as claimed in claim 9 wherein the relative disposition of said foot pedals associated with said first steering device are identical in relative disposition to said foot pedals associated with said second steering device.

11. A tractor as claimed in claim 9 wherein said implement or tool comprises a seed drill.

12. A tractor as claimed in claim 9 wherein said implement or tool comprises a mowing machine.

* * * * *